(12) United States Patent
Breeden

(10) Patent No.: US 6,714,634 B1
(45) Date of Patent: Mar. 30, 2004

(54) METHOD AND APPARATUS FOR SELECTING DISABLING MUSIC ON HOLD IN A TELECOMMUNICATION SYSTEM

(75) Inventor: R. Louis Breeden, Azle, TX (US)

(73) Assignee: Motorola, Inc., Schaumburg, IL (US)

( * ) Notice: Subject to any disclaimer, the term of this patent is extended or adjusted under 35 U.S.C. 154(b) by 707 days.

(21) Appl. No.: 09/631,858

(22) Filed: Aug. 3, 2000

(51) Int. Cl.[7] ............................................. H04M 3/42
(52) U.S. Cl. ...................... 379/202.01; 379/204.01; 379/215.01
(58) Field of Search .......... 379/201.01, 202.01–203.01, 379/204.01, 205.01, 207.01, 207.02, 215.01, 162, 266.01, 393, 158

(56) References Cited

U.S. PATENT DOCUMENTS

| | | | |
|---|---|---|---|
| 4,953,204 A | | 8/1990 | Cuschleg, Jr. et al. .. 379/266.05 |
| 6,349,136 B1 | * | 2/2002 | Light et al. ............. 379/202.01 |
| 6,353,662 B1 | * | 3/2002 | Foladare et al. ........ 679/101.01 |
| 6,556,670 B1 | * | 4/2003 | Horn ...................... 379/202.01 |

* cited by examiner

Primary Examiner—Fan Tsang
Assistant Examiner—Ovidio Escalante
(74) Attorney, Agent, or Firm—R. Louis Breeden; Hisashi D. Watanabe

(57) ABSTRACT

A caller makes (302) a telephone call to a second telecommunication system (108) from a telephone port (202) in a first telecommunication system (104). The first telecommunication system then ascertains (304) whether the second telecommunication system is a type for which receiving music on hold is appropriate. The first telecommunication system disables (308) music on hold for the telephone call, in response to ascertaining that the second telecommunication system is not the type for which receiving music on hold is appropriate.

14 Claims, 2 Drawing Sheets

METHOD AND APPARATUS FOR SELECTING DISABLING MUSIC ON HOLD IN A TELECOMMUNICATION SYSTEM

FIELD OF THE INVENTION

This invention relates in general to telecommunication systems, and more specifically to a method and apparatus for selectively disabling music on hold in a telecommunications system.

BACKGROUND OF THE INVENTION

Music on hold (MOH) is a popular feature in a telecommunication system such as a private automatic branch exchange (PABX). System operators have used the music-on-hold feature to entertain persons whose telephone calls have been put on hold. Some businesses use the music-on-hold feature to play advertisements to customers who have been put on hold.

A problem with music on hold is that it is not appropriate to send music on hold to certain types of telecommunication systems. One such system that comes to mind is a conference bridge having a plurality of users participating in a conference call. If one of the users temporarily places his line on hold, e.g., to answer an expected important call, and his PABX has the music-on-hold feature, the feature will disrupt the conference call for the remainder of the users until he rejoins the conference call. Another type of system which can have a problem with a music-on-hold feature which sends music (as opposed to ads, jokes, etc.) is a communication system which uses vocoders in its transmission paths. Vocoders are known to add annoying noise and distortion to music.

Thus, what is needed is a method and apparatus for selectively disabling music on hold in a telecommunication system. The method and apparatus preferably will operate automatically and transparently with regard to the users of the telecommunication system.

DETAILED DESCRIPTION OF THE DRAWINGS

Figure 1:
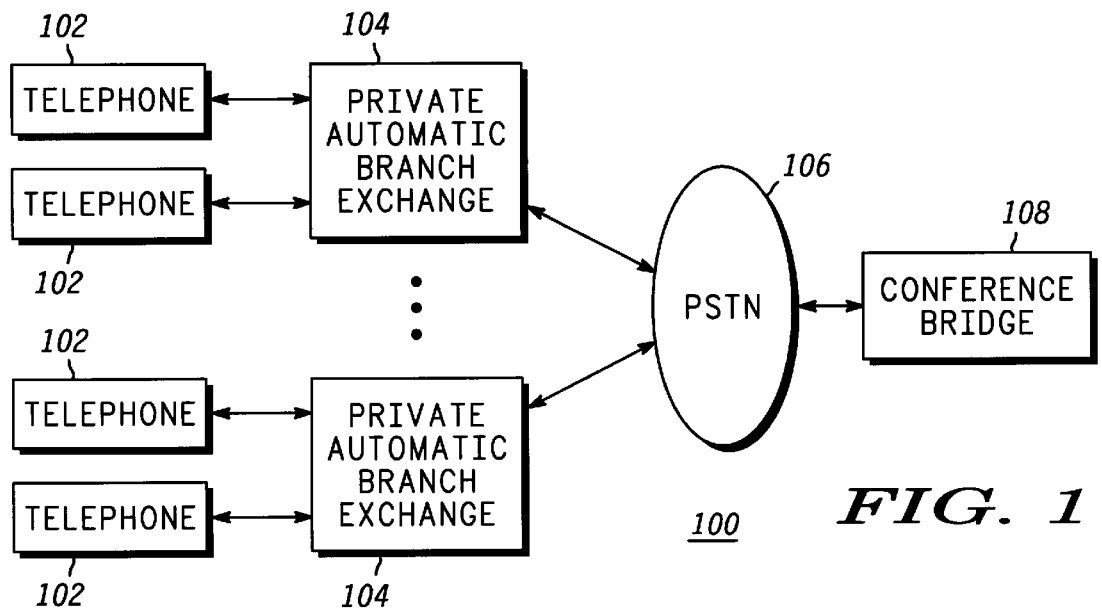
FIG. 1 is an exemplary electrical block diagram of a communication system in accordance with the present invention.

Referring to FIG. 1, an exemplary electrical block diagram depicts a communication system 100 in accordance with the present invention. The communication system 100 comprises a plurality of conventional telephones 102, coupled to one or more first telecommunication systems, which, in one embodiment, are private automatic branch exchanges (PABXs) 104. The PABXs 104 preferably are coupled through a network such as the public switched telephone network (PSTN) 106 to a second telecommunication system, which, in one embodiment, is a conventional conference bridge 108. It will be appreciated that, alternatively, the second telecommunication system 108 can be collocated with the one or more first telecommunication systems 104 and coupled directly thereto, rather than through the PSTN 106.

Figure 2:
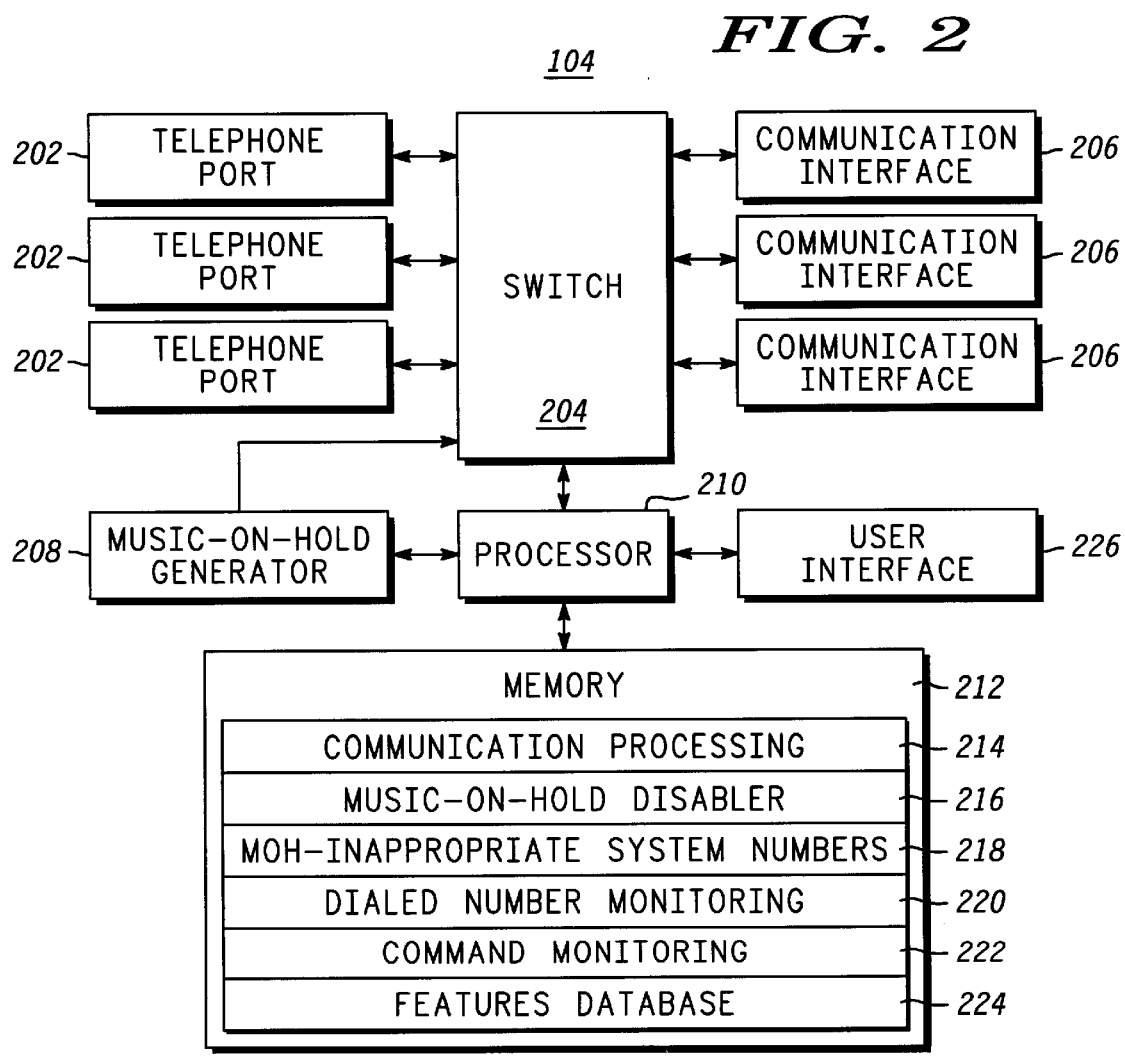
FIG. 2 is an exemplary electrical block diagram of a private automatic branch exchange in accordance with the present invention.

FIG. 2 is an exemplary electrical block diagram of the private automatic branch exchange (PABX) 104 in accordance with the present invention. The PABX 104 comprises a plurality of conventional telephone ports 202 for allowing a user to place and receive telephone calls. More specifically, in accordance with the present invention, the telephone port 202 allows a caller to make a telephone call to a second telecommunication system, such as the conference bridge 108. In one embodiment, the PABX 104 further comprises a conventional switch 204 for connecting telephone calls. The PABX 104 preferably also includes a plurality of conventional communication interfaces 206 for communicating with another telecommunication system outside the PABX 104. The communication interface 206 preferably carries both telephone calls, e.g., voice or digitized voice, and the signaling therefor, e.g., SS7 signals. In addition, the PABX 104 includes a conventional processor 210 coupled to the switch 204 for processing the telephone calls and for controlling the PABX 104. It will be appreciated that, in some digital embodiments, the functions of the switch 204 can be performed in the processor 210, thereby eliminating the need for the separate switch 204. The processor 210 is also coupled to a conventional music-on-hold (MOH) generator 208 for control thereof. In addition, the MOH generator 208 is, preferably coupled to the switch 204 for adding music on hold to telephone calls that have been placed on hold. It will be appreciated that, alternatively, the functions of the music-on-hold generator 208 can be performed in the processor 210, thereby eliminating the separate music-on-hold generator 208. It is also to be understood that the term "music" can include advertisements, jokes, news, and other entertainment, in lieu of music. The PABX 104 further comprises a conventional user interface 226 coupled to the processor 210 for enabling user control and programming of the PABX 104.

The processor 210 is also coupled to a memory 212 for storing operating data and software for programming the processor 210. The memory 212 comprises a communication processing program 214 for programming the processor 210 to process the communications handled by the PABX 104. The memory 212 further comprises a music-on-hold disabler program 216 for programming the processor 210 to disable music on hold for a telephone call, in response to ascertaining that a called second telecommunication system is not a type of system for which receiving music on hold is appropriate. In one embodiment, the memory 212 also includes a space for storing a list of MOH-inappropriate system numbers 218, i.e., the telephone numbers of telecommunication systems for which receiving music on hold is appropriate. In this embodiment, the memory 212 further comprises a dialed number monitoring program 220 for programming the processor 210 to cooperate with the switch 204 to monitor a telephone call to determine the number dialed, and to compare the number dialed with the list of MOH-inappropriate system numbers 218 to determine whether the number dialed is included in the list of MOH-inappropriate system numbers 218, thus indicating that the telecommunication system being called should not be sent music on hold. It will be appreciated that, alternatively, the list of MOH-inappropriate system numbers 218 can include ranges of numbers (as opposed to individual numbers) used for accessing telecommunication systems which should not be sent music on hold.

In another embodiment, the memory 212 includes a command monitoring program 222 for programming the processor 210 cooperate with the telephone port 202 and the switch 204 to receive a command from a caller using the telephone port 202, the command indicating that music on hold is to be disabled for the telephone call, and to disable music on hold for the telephone call, in response receiving the command. It will be appreciated that the command can be a predetermined sequence of dialed characters, e.g., *66. Alternatively, the command can be the depression of a dedicated button, e.g., a "Conference Hold" button. The command monitoring program 222 preferably also programs the processor 210 to cooperate with the communication interface 206 and the switch 204 to receive a command from a user of a second telecommunication system, e.g., the conference bridge 108, the command indicating that music on hold is to be disabled for the telephone call, and to disable music on hold for the telephone call, in response to receiving the command. This last feature is useful when, for example, in a non-automatic first telecommunication system a user forgets to enter the command to disable music on hold before placing his call on hold. The users of the second telecommunication system, e.g., the remaining users coupled through the conference bridge 108, can themselves enter a command to disable the offending music-on-hold feature of the first telecommunication system. The memory 212 also includes a conventional features database 224 for defining the services and features assigned to each user. It will be appreciated that, alternatively, multiple levels of disabling the music-on-hold feature can be implemented. For example, actual music can be disabled, while voice forms of music on hold, e.g., jokes, news, advertisements, can be allowed, and vice versa.

Figure 3:
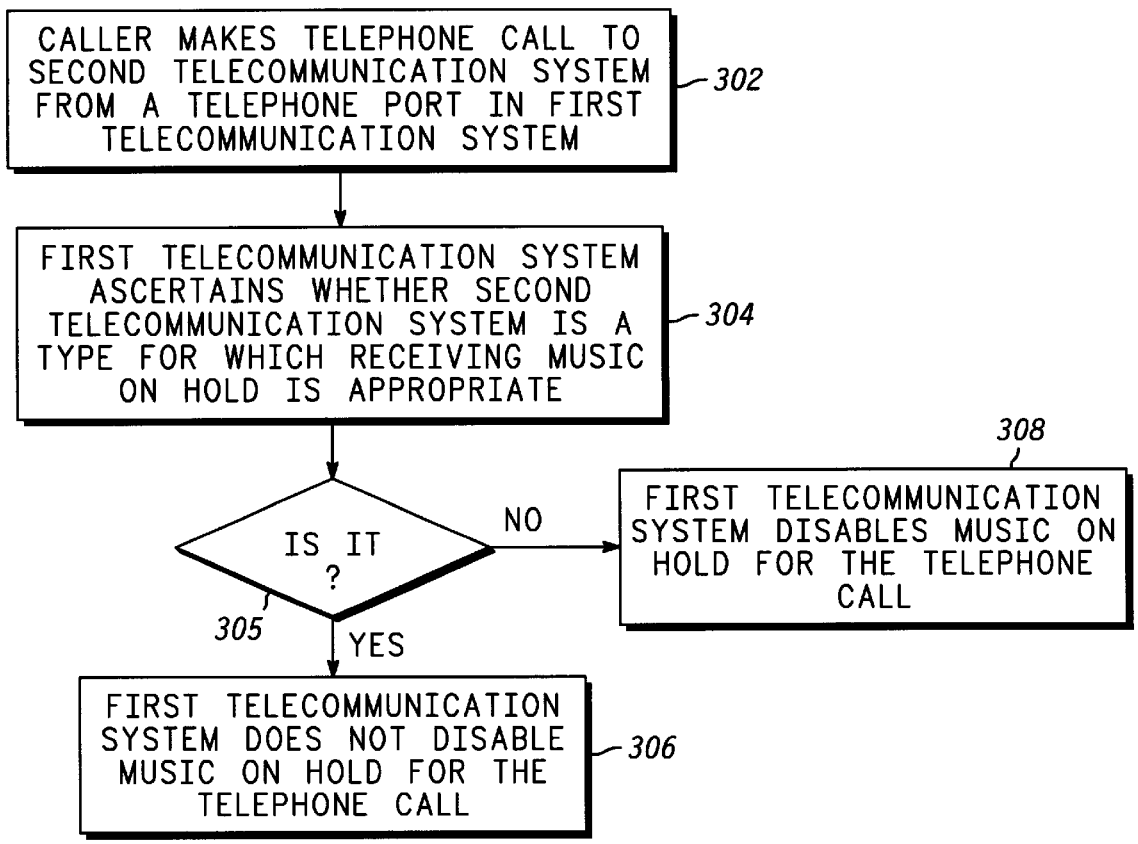
FIG. 3 is an exemplary flow diagram depicting operation of the communication system in accordance with the present invention.

FIG. 3 is an exemplary flow diagram 300 depicting operation of the communication system 100 in accordance with the present invention. The flow begins when a caller makes 302 a telephone call to a second telecommunication system 108 from a telephone port 202 in a first telecommunication system 104. The first telecommunication system 104 then ascertains 304 whether the second telecommunication system 108 is a type for which receiving music on hold is appropriate. Depending on the specific embodiment, the first telecommunication system 104 can ascertain this information in several different manners.

In one embodiment, the second telecommunication system 108 sends a message to the first telecommunication system 104 indicating whether the second telecommunication system 108 is the type of system for which receiving music on hold is appropriate, in response to the telephone call. In another embodiment, the first telecommunication system stores a list of telephone numbers of telecommunication systems for which music on hold is not appropriate, and then checks the dialed number of each outbound telephone call (and, when available, the calling line identification of each inbound call) against the list to determine whether to disable music on hold for the telephone call. In a third embodiment, users of at least one of the first and second telecommunication systems can manually enter a command to disable the music-on-hold feature. It will be appreciated that features of the three embodiments described above can be combined in the communication system 100 to provide greater flexibility.

Regardless how the ascertainment is made, the first telecommunication system 104 at step 306 does not disable the music-on-hold feature for the telephone call when at step 305 music on hold is determined appropriate for the second telecommunication system, and, advantageously, at step 308 does disable the music-on-hold feature for the telephone call when at step 305 music on hold is determined not appropriate for the second telecommunication system.

It should be clear from the preceding disclosure that the present invention provides a method and apparatus for selectively disabling music on hold in a telecommunication system. Advantageously, in the preferred embodiment, the method and apparatus operates automatically and transparently with regard to the users of the telecommunication system.

Many modifications and variations of the present invention are possible in light of the above teachings. For example, the embodiments disclosed herein have used a PABX as the first telecommunication system and a conference bridge as the second telecommunication system. Alternatively, a key telephone system or an individual telephone set having a built-in music-on-hold feature can be used as the first telecommunication system, while a wireless communication system that employs vocoders can be used as the second telecommunication system. Many other substitutions will be readily apparent to one of ordinary skill in the art. Thus, it is to be understood that, within the scope of the appended claims, the invention can be practiced other than as specifically described herein above.

What is claimed is:

1. A private automatic branch exchange (PABX) for selectively disabling music on hold therein, the PABX comprising:

a telephone port for making, by a caller, a telephone call to a conference bridge;

a processor coupled to the telephone port for ascertaining whether the conference bridge is a type of system for which receiving music on hold is appropriate; and a memory coupled to the processor for storing a telephone number for reaching the conference bridge in a list of numbers of systems for which music on hold is not appropriate, wherein the processor is programmed to:

disable music on hold for said telephone call, in response to ascertaining that the conference bridge is not the type of system for which receiving music on hold is appropriate;

monitor said telephone call to determine a number dialed; and compare said number dialed with said list to determine whether said number dialed is included in said list, thus indicating that the conference bridge should not be sent music on hold.

2. The PABX of claim 1, further comprising a communication interface coupled to the processor for communicating with the conference bridge, wherein the processor is further programmed to cooperate with the communication interface to receive a message from the conference bridge indicating whether the conference bridge is the type of system for which receiving music on hold is appropriate, in response to said telephone call.

3. The PABX of claim 1, wherein the processor is further programmed to:

receive a command from the caller using said telephone port, said command indicating that music on hold is to be disabled for said telephone call, and disable music on hold for said telephone call, in response receiving the command.

4. The PABX of claim 1, further comprising a communication interface coupled to the processor for communicating with the conference bridge, and wherein the processor is further programmed to:

cooperate with the communication interface to receive a command from a user of the conference bridge, said command indicating that music on hold is to be disabled for said telephone call; and disable music on hold for said telephone call, in response to receiving the command.

5. A method for disabling music on hold in a first telecommunication system, the method comprising the steps of:

storing in the first telecommunication system a telephone number for reaching a second telecommunication system in a list of numbers of telecommunication systems that are not the type for which receiving music on hold is appropriate;

making, by a caller, a telephone call to the second telecommunication system from a telephone port in the first telecommunication system;

ascertaining by the first telecommunication system whether the second telecommunication system is a type for which receiving music on hold is appropriate, wherein the ascertaining step comprises the steps of:

monitoring the step of making the telephone call to determine a number dialed; and comparing said number dialed with said list to determine whether said number dialed is included in said list, thus indicating that the second telecommunication system should not be sent music on hold; and disabling, in the first telecommunication system, music on hold for said telephone call, in response to ascertaining that the second telecommunication system is not the type for which receiving music on hold is appropriate.

6. The method of claim 5, wherein the ascertaining step comprises the step of receiving, by the first telecommunication system, a message from the second telecommunication system indicating whether the second telecommunication system is the type for which receiving music on hold is appropriate, in response to said telephone call.

7. The method of claim 5, wherein the ascertaining step comprises the step of receiving, by the first telecommunication system, a command from the caller using said telephone port in the first telecommunication system, said command indicating that music on hold is to be disabled for said telephone call, and wherein the disabling step comprises the step of disabling, in the first telecommunication system, music on hold for said telephone call, in response to said receiving step.

8. The method of claim 5, wherein the ascertaining step comprises the step of receiving, by the first telecommunication system, a command from a user of the second telecommunication system, said command indicating that music on hold is to be disabled for said telephone call, and wherein the disabling step comprises the step of disabling, in the first telecommunication system, music on hold for said telephone call, in response to said receiving step.

9. The method of claim 5, where in the step of making said telephone call includes the step of connecting to a conference bridge used for conferencing a plurality of users with the caller, and wherein the ascertaining step comprises the step of determining that the conference bridge should not be sent music on hold by the first telecommunication system.

10. A first telecommunication system for selectively disabling music on hold therein, the first telecommunication system comprising:

a telephone port for making, by a caller, a telephone call to a second telecommunication system;

a processor coupled to the telephone port for ascertaining whether the second telecommunication system is a type for which receiving music on hold is appropriate; and a memory coupled to the processor for storing a telephone number for reaching the second telecommunication system in a list of numbers of telecommunication systems for which music on hold is not appropriate, wherein the processor is programmed to:

disable music on hold for said telephone call, in response to ascertaining that the second telecommunication system is not the type for which receiving music on hold is appropriate;

monitor said telephone call to determine a number dialed; and compare said number dialed with said list to determine whether said number dialed is included in said list, thus indicating that the second telecommunication system should not be sent music on hold.

11. The first telecommunication system of claim 10, further comprising a communication interface coupled to the processor for communicating with the second telecommunication system, wherein the processor is further programmed to cooperate with the communication interface to receive a message from the second telecommunication system indicating whether the second telecommunication system is the type for which receiving music on hold is appropriate, in response to said telephone call.

12. The first telecommunication system of claim 10, wherein the processor is further programmed to:

receive a command from the caller using said telephone port, said command indicating that music on hold is to be disabled for said telephone call, and disable music on hold for said telephone call, in response receiving the command.

13. The first telecommunication system of claim 10, further comprising a communication interface coupled to the processor for communicating with the second telecommunication system, and wherein the processor is further programmed to:

cooperate with the communication interface to receive a command from a user of the second telecommunication system, said command indicating that music on hold is to be disabled for said telephone call; and disable music on hold for said telephone call, in response to receiving the command.

14. The first telecommunication system of claim 10, wherein the second telecommunication system is a conference bridge used for conferencing a plurality of users with the caller, and wherein the processor is programmed to determine that the conference bridge should not be sent music on hold by the first telecommunication system.

* * * * *